April 15, 1947.    R. W. KREBS    2,418,890
STRIPPING OF SPENT CATALYST PARTICLES IN THE CATALYTIC
CONVERSION OF HYDROCARBONS
Filed Aug. 13, 1943
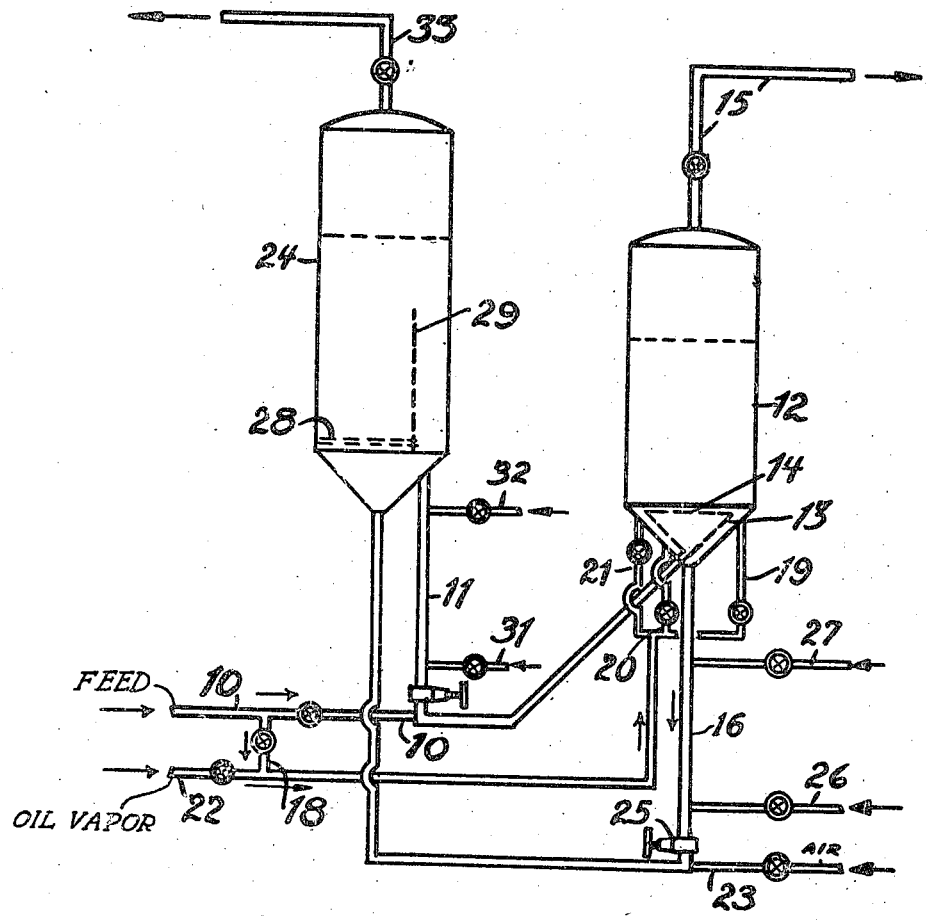
Robert W. Krebs Inventor
By P. L. Young Attorney Patented Apr. 15, 1947

2,418,890

UNITED STATES PATENT OFFICE 2,418,890

STRIPPING OF SPENT CATALYST PARTICLES IN THE CATALYTIC CONVERSION OF HYDROCARBONS

Robert W. Krebs, Baton Rouge, La., assignor to Standard Oil Development Company, a corporation of Delaware Application August 13, 1943, Serial No. 498,478

4 Claims. (Cl. 196—52)

This invention relates to the conversion of hydrocarbon oils in the presence of finely divided solid materials and pertains more particularly to a method of removing volatile reaction products absorbed or contained on the finely divided solid material.

While the invention may have a more general application, it is especially adaptable to fluid catalyst processes in which finely divided catalytic material maintained in a fluid state by keeping a small amount of gas in admixture therewith is caused to circulate continuously through a conversion and regeneration zone.

For example, within the past year plants have been constructed for cracking hydrocarbon oils in which finely divided cracking catalysts have been forced into a stream of oil at a controlled rate by a fluid pressure generated at the base of a vertical column of said finely divided catalyst. Catalyst within the column is maintained in a fluid state by admixture with a small amount of an aerating or fluidizing gas. By keeping a small amount of such gas in intimate mixture with the finely divided material the resulting mixture tends to seek its own level, generate fluid pressure and otherwise behave in many respects as a liquid.

Following the addition of the finely divided catalyst to the oil stream, the resulting mixture is charged into the bottom portion of a vertical elongated cracking chamber through which the oil vapors pass upwardly at a velocity controlled to permit the bulk of the catalyst to settle into a relatively dense layer which is maintained in a turbulent state by the upward passage of the oil vapors therethrough.

The cracked vapors are removed from the upper end of the cracking chamber and passed to suitable recovery equipment such as a fractionating tower for segregation of products into desired fractions.

A stream of catalyst is continuously removed from the bottom portion of the cracking chamber below the level of the catalyst layer and discharged into a vertical column which generates sufficient fluid pressure for feeding the catalyst into a stream of air passing to a regeneration zone. The air is passed upwardly through the regeneration zone at a controlled velocity to permit the catalyst to segregate into a dense layer in the bottom portion similar to the layer existing in the cracking chamber. The spent combustion gases containing a small amount of entrained catalyst are removed from the top of the regeneration chamber and passed to additional recovery equipment for removal of the entrained catalyst therefrom. The regenerated catalyst is withdrawn from the bottom portion of the regeneration chamber and discharged into the top of the first-named column for return to the cracking chamber. The catalyst is withdrawn from the cracking and regeneration chambers at a rate which will maintain the level of the catalyst layer a substantial distance below the top of the chambers so as to reduce the amount of entrainment of catalyst in the gases or vapors passing overhead to the minimum.

The catalyst removed from the bottom portion of the cracking chamber normally contains a substantial amount of higher boiling valuable reaction products. It is usually desirable to remove these valuable reaction products from the catalyst withdrawn from the cracking chamber prior to passing the same into the regeneration chamber since these products will not only be destroyed during regeneration but will increase the amount of heat generated.

It has heretofore been proposed to remove these more valuable higher boiling hydrocarbons from the spent catalyst withdrawn from the cracking chamber by passing a relatively inert stripping gas into the bottom section of the cracking chamber adjacent the outlet for the catalytic material. This gas tends to strip or remove the more valuable volatile hydrocarbons contained on the catalyst being withdrawn. However, one objection to the process as previously carried out is that the stripping gas passes upwardly into the main portion of the cracking chamber and becomes intermingled with the products undergoing reaction therein. This increases the volume of gaseous products removed from the cracking chamber and consequently increases the size of the fractionating or recovery equipment necessary for final separation of the cracked products.

Furthermore, it has been found that steam, which is the cheapest and most available source of stripping gas, in many cases tends to deactivate the catalyst.

The principal object of the present invention is to provide a method of removing the more valuable reaction products from the catalyst being withdrawn from the conversion zone.

Other objects and advantages of the invention will be apparent from the more detailed description hereinafter.

In accordance with the present invention, the more valuable reaction products are removed from the catalyst being withdrawn from the conversion chamber by contacting the catalyst immediately prior to withdrawal with a portion of the hydrocarbons to be treated or a hydrocarbon oil fraction boiling above the boiling range of the initial feed. By contacting the spent catalyst with the fresh feed or a higher boiling hydrocarbon fraction, the more valuable reaction products absorbed or contained on the catalyst being withdrawn are not only replaced by the untreated fresh feed or higher boiling fraction but the amount of fresh feed absorbed is less than the products absorbed. Consequently, the catalyst passing to the regeneration zone contains a smaller amount of combustible material of less value than reaction products originally absorbed therein.

While the invention has a more general application as above pointed out, it is especially adaptable to processes capable of producing premium products such as dehydrogenation of butane to butene or the dehydrogenation of butene to butadiene.

For a better understanding of the invention reference will now be made to the accompanying drawing which is a diagrammatic illustration of an apparatus suitable for carrying the invention into effect. For descriptive purposes the invention will be described as applied to the dehydrogenation of butane to butene.

Referring to the drawing the reference character 10 designates a charge line through which the fresh feed, which in the particular case illustrated is butane, is introduced into the system. A finely divided dehydrogenating catalyst is discharged from the base of a vertical pipe or column 11 through a control valve into the feed line 10. The butane prior to admixture with the catalyst may be preheated to the desired reaction temperature, such as a temperature from 900° F. to 1100° F., or the catalyst introduced into the oil feed may be heated to a temperature substantially above the final desired temperature so that a substantial portion of the heat necessary for dehydrogenation is supplied by the sensible heat of the hot catalyst introduced into the feed. The catalyst employed in the operation may be any conventional dehydrogenating catalyst. Particularly suitable catalysts are formed from group VI oxides and particularly the molybdenum oxide or chromium oxide which may be supported on suitable carriers such as alumina, magnesia or the like. The catalyst should be in a finely divided state having a particle size ranging, for example, between 0 and 200 microns.

The amount of catalyst introduced will depend on the activity of the catalyst, the degree of conversion desired, the temperature of the operation, and other factors. In cases where the heat is supplied by hot catalyst the amount of catalyst introduced will be controlled to maintain the desired temperature in the reaction zone. In general, the amount of catalyst introduced may be between 0.5 and 20 or more parts of catalyst per part of butane by weight.

The mixture of catalyst and butane formed in line 10 is transmitted into the bottom section of a dehydrogenating chamber 12 preferably through a distributing cone 13 having a perforated grid 14 through which the suspension passes into the main body of the reactivating chamber.

The distributing cone 13 is spaced from the outer wall of the reaction chamber 12 to form an annular chamber for the withdrawal of the stream of catalyst from the reaction chamber, as later described.

The velocity of the butane passing upwardly through the dehydrogenating chamber 12 is controlled to permit the bulk of the catalyst to settle into a relatively dense layer in the bottom portion of the chamber, as illustrated in the drawing. The rate of withdrawal of the catalyst from the chamber is controlled to maintain the level a substantial distance below the top of the chamber, as illustrated, so as to reduce the amount of entrained solids carried overhead from the chamber by the gaseous reaction products.

The pressure employed for carrying out the dehydrogenation is not critical, and superatmospheric or mild superatmospheric pressures may be used. The time of contact of the butane with the catalyst in the dehydrogenation zone may also vary over a considerable range depending upon a number of factors. This contact time may be of the order of from 0.1 to 20 seconds or more.

The gaseous reaction products after passing through the chamber 12 are removed overhead through line 15 and may be passed to suitable recovery equipment not shown.

The bottom of the reaction chamber 12 communicates with a vertical column 16 through which the catalyst is continuously removed from the reaction chamber.

In accordance with the present invention there is introduced into the bottom portion of the reaction chamber immediately adjacent the point of removal of the catalyst therefrom a portion of the feed or higher boiling hydrocarbons so that higher boiling reaction products absorbed or contained on the catalyst being removed are replaced by fresh feed or the higher boiling fractions. For example, a portion of the fresh feed introduced through line 10 may be passed through line 18 having a plurality of branch lines 19, 20 and 21 leading into the annular space surrounding the distributing cone 13. When employing fresh feed for stripping, the reactants are not contaminated with extraneous gas. Instead of using fresh feed, an extraneous oil vapor may be introduced into the system through line 22 for stripping or removing the valuable reaction products from the catalyst being removed from the reaction chamber 12.

The vertical column or conduit 16 communicating with the base of the reaction chamber 12 connects at its lower end with the air line 23 which carries the catalyst into a regenerating chamber 24. The conduit 16 is preferably provided with a control valve 25 for regulating the rate of withdrawal of the catalyst from the reaction chamber 12.

The vertical column or conduit 16 also serves as a standpipe for restoring or generating pressure on the finely divided material being circulated through the system. In order to avoid plugging or packing of the catalyst in column 16 and to maintain the catalyst therein in a fluid state capable of generating a fluid pressure at the base thereof, a small amount of aerating gas should be maintained in admixture with the catalyst in the column. In some cases it is desirable to add such a gas at two or more spaced points along the column through lines 26 and 27.

The spent catalyst discharged into the air line 23 is carried into the base of the regeneration chamber 24 below a distributing grid 28.

The velocity of the air passing upwardly through the regeneration chamber 24 is also controlled as previously described with reference to the butane gas passing through the reaction chamber 12 to permit the bulk of the catalyst to segregate into a dense layer in the bottom portion of the regeneration chamber 24. The catalyst within the regeneration chamber 24 is reactivated by burning combustible deposits therefrom. The regeneration chamber 24 may be provided with a vertical wall or partition 29 forming a trap or well for collecting catalyst to be returned to the reaction zone.

The well formed by the vertical wall 29 connects at the bottom portion thereof with the vertical conduit 11 which discharges into line 10. A small amount of aerating gas may be introduced into the column 11 at two or more spaced points through lines 31 and 32.

Spent regeneration gas is removed from the top of the regeneration chamber 24 through line 33. This gas may be passed to additional separating devices for removal of entrained catalyst therefrom and thereafter vented to the atmosphere.

With continuous circulation of the finely divided catalytic material through the reaction and regeneration zone as above described, a certain loss in pressure must necessarily result and it is therefore necessary to restore the pressure on the catalyst being circulated. This is accomplished, as illustrated on the drawings, by maintaining the conduits 11 and 16 of a height sufficient to generate a fluid pressure sufficient to overcome the drop in pressure through the reaction and regeneration equipment.

Having described the preferred embodiment of the invention, it will be understood that it embraces such other variations and modifications as come within the spirit and scope thereof.

What is desired to be protected by Letters Patent is:

1. A process for the conversion of hydrocarbon oils wherein the oil to be converted is passed upwardly in vapor form through a reaction zone containing a layer of finely divided conversion catalyst at a velocity controlled to maintain said layer in a dense turbulent condition and wherein a stream of catalyst is continuously introduced and removed from said conversion zone; the improvement in the method of removing entrained vaporous reaction products from the catalyst removed from the zone which comprises downwardly withdrawing a stream of catalyst from said layer into a stripping zone, contacting the catalyst within said stripping zone with a stream of hydrocarbon vapors having a boiling point not lower than the boiling point of the feed to thereby replace valuable reaction products from the catalyst.

2. In the process defined in claim 1 the further improvement which comprises passing a portion of the hydrocarbons to be converted in contact with said catalyst within the stripping zone to remove valuable reaction products therefrom and thereafter passing vaporous products from said stripping zone to said reaction zone.

3. In a process for dehydrogenating hydrocarbons wherein the hydrocarbons are passed upwardly through a dehydrogenating zone containing a layer of finely divided dehydrogenating catalyst at a controlled velocity to maintain said layer in a turbulent fluid state and wherein a stream of dehydrogenating catalyst is continuously introduced and removed from said zone; the improvement in the method of removing dehydrogenated products from the catalyst withdrawn from said zone which comprises withdrawing a stream of said catalyst from said layer directly into a stripping zone, passing a stream of hydrocarbon vapor having a boiling point not lower than the boiling point of the hydrocarbons to be dehydrogenated through said stripping zone in contact with said catalyst and thereafter passing the hydrocarbons from said stripping zone to said reaction zone.

4. In a process for dehydrogenating butanes to form butenes wherein a stream of butane gas is passed upwardly through a dehydrogenating zone containing a layer of finely divided dehydrogenating catalyst at a velocity controlled to maintain said layer in a dense, turbulent, fluid state and wherein a stream of dehydrogenating catalyst is continuously introduced and removed from said zone, the improvement in the method of removing butenes from the catalyst withdrawn from said zone which comprises downwardly withdrawing a stream of said catalyst from said layer directly into a stripping zone, passing a separate stream of butane gas upwardly through said stripping zone in countercurrent contact with said catalyst and passing the butane-containing gas from the top of said stripping zone into said reaction zone.

ROBERT W. KREBS.

REFERENCES CITED

The following references are of record in the file of this patent:

UNITED STATES PATENTS

| Number | Name | Date |
|---|---|---|
| 2,326,705 | Thiele et al. | Aug. 10, 1943 |
| 2,328,325 | Butikofer | Aug. 31, 1943 |
| 2,311,978 | Conn | Feb. 23, 1943 |
| 2,334,555 | Howard | Nov. 16, 1943 |
| 2,337,684 | Scheineman | Dec. 28, 1943 |
| 2,338,573 | Creelman | Jan. 4, 1944 |
| 2,348,699 | Tuttle | May 9, 1944 |
| 2,356,611 | Peters | Aug. 22, 1944 |
| 2,362,621 | Fahnstock | Nov. 14, 1944 |
| 2,367,694 | Snuggs | Jan. 23, 1945 |

FOREIGN PATENTS

| Number | Country | Date |
|---|---|---|
| 115,689 | Australia | Aug. 6, 1942 |